O. R. CHAPLIN,
Assignor to D. A. NEWTON & S. H. BELLOWS.
Combined Square and Bevel.
No. 9,183. Reissued May 4, 1880.
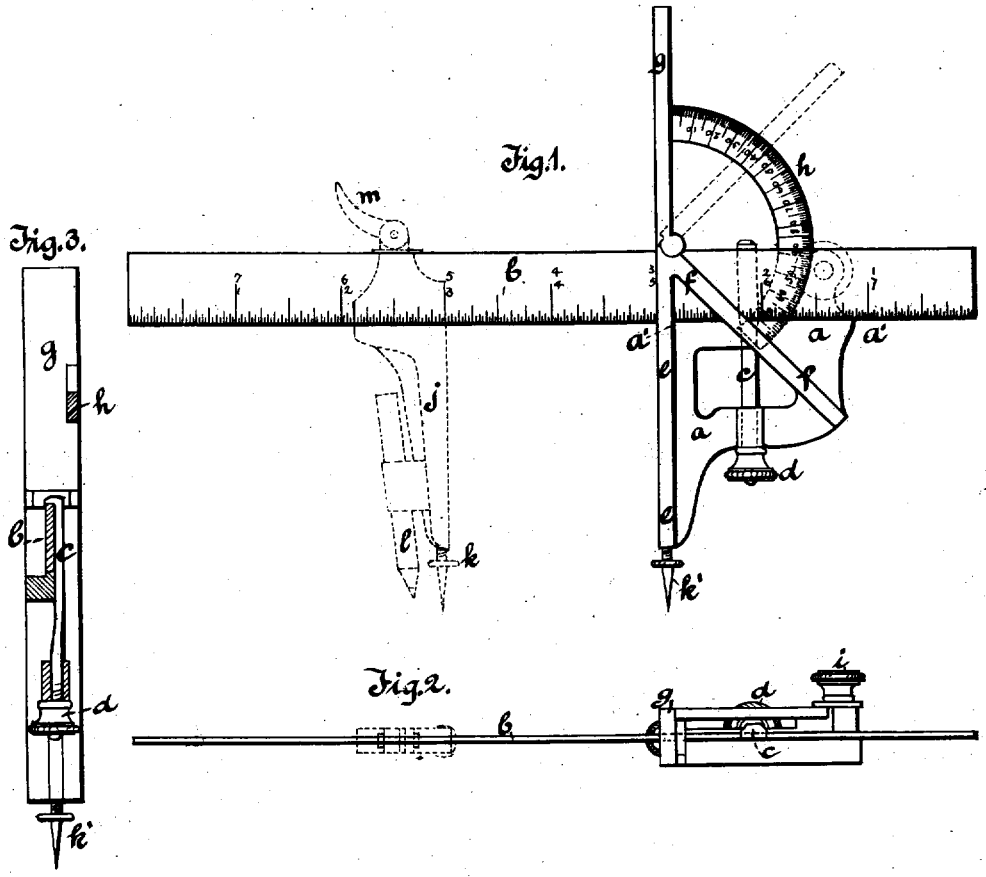
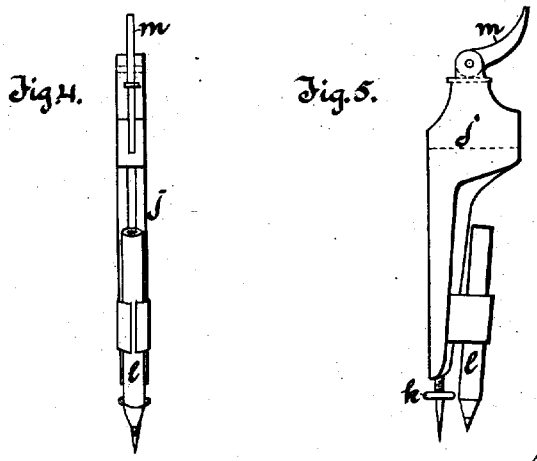
Witnesses
R. F. Crawford
Wm. H. Moloney
Inventor:
O. R. Chaplin
By W. E. Simonds
Atty.
N. PETERS, PHOTO-LITHOGRAPHER, WASHINGTON, D. C.

UNITED STATES PATENT OFFICE.

ORRIL R. CHAPLIN, OF BOSTON, MASSACHUSETTS, ASSIGNOR TO DANIEL A. NEWTON AND STEPHEN H. BELLOWS.

COMBINED SQUARE AND BEVEL.

SPECIFICATION forming part of Reissued Letters Patent No. 9,183, dated May 4, 1880.

Original No. 54,503, dated May 8, 1866. Application for reissue filed March 6, 1880.

*To all whom it may concern:*

Be it known that I, ORRIL R. CHAPLIN, of Boston, in the county of Suffolk and State of Massachusetts, have invented a new and useful Mechanic's Combination-Tool, whereof the following is a description, reference being had to the accompanying drawings, where—

Figure 1 is a side view of a tool embodying my invention. Fig. 2 is a top or edge view of the same. Fig. 3 is a view of same in vertical section. Figs. 4 and 5 are edge and side views of the compass-leg.

The letter *a* denotes a base or frame having a seat, *a′ a′*, for the graduated sliding blade *b*, and *c* denotes a sliding bolt hung in and upon the base *a*, its upper end hooked to take hold of the sliding blade, and provided at the lower end with a screw-thread bearing the thumb-nut *d*, bearing on the base *a*, by the rotation and manipulation of which thumb-nut the blade may be pulled down to its seat, thus insuring that in all adjustments of the blade it shall always rest squarely on an extended seat and always preserve the same relation, so far as direction is concerned, with the base *a* and those parts fixed to it, at the same time avoiding the inconvenience of having the base *a* extend to the upper side of the blade, in order to there form a seat for the blade, as would, in substance, be necessary if the sliding bolt, in its present relation, pushed the blade to its seat.

The base *a* has fixed to it the arm *e*, the face of which is at a right angle to the blade *b*, for which reason I term it the "right-angular arm," this arm and the blade being usable together, for the purposes of a common square, T-square, or try-square. The adjustability of the blade with reference to the arm makes the tool usable as a depth-gage or the like. The base *a* has also fixed to it the arm *f*, the face of which is at an acute angle to the blade *b*, this arm and the blade being usable together in striking miter or bevel lines, for which reason I term this arm the "bevel-arm." The adjustability of the blade with reference to this arm renders the tool usable as a depth-gage on bevel-lines and the like.

The letter *g* denotes an arm hinged to the base *a*, provided with the graduated sector *h*, and *i* is a thumb-nut co-operating with the sector to hold it and the arm *g* at any desired adjustment, the most common of which are an adjustment in line with the right-angular arm, to practically extend the length of that arm, and an adjustment (indicated by dotted lines) when it is used, in connection with the bevel-arm, for centering shafts and the like.

The letter *j* denotes a supplementary compass-leg carrying the point *k* and pencil *l*, all of which may be readily attached to the blade *b* by means of the eccentric-cam *m*, and when so attached, as shown in dotted lines in Fig. 1, may be used as a compass, and by removing the compass-points *k k′* (the latter of which screws into the end of the right-angular arm) it may be used as a caliper.

Where, in the following claims, I use the term "clamp-bolt," I mean thereby a bolt which pulls, not pushes, the blade to its seat.

Having thus described my invention, I claim—

1. The sliding blade, the base bearing the right-angular arm and the seat for the blade, and the clamp-bolt, all combined for operation and use substantially as shown and described.

2. The sliding blade, the base bearing the seat for the blade and the right-angular and bevel arms, and the clamp-bolt, all combined for operation and use substantially as shown and described.

3. The sliding blade, the clamp-bolt, the base bearing the seat for the blade and the right-angular and bevel arms, the hinged arm bearing the graduated sector, and the thumb-nut co-operating with the sector, all combined for operation and use substantially as shown and described.

ORRIL R. CHAPLIN.

Witnesses:

CHS. HOUGHTON,

J. W. STEMBLER.